(12) United States Patent
Bergmann

(10) Patent No.: US 6,528,452 B1
(45) Date of Patent: Mar. 4, 2003

(54) CATALYTICALLY ACTIVE STRUCTURE

(75) Inventor: Andrée Bergmann, Lohmar (DE)

(73) Assignee: Emitec Gesellschaft fur Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/685,661

(22) Filed: Oct. 10, 2000

Related U.S. Application Data

(63) Continuation of application No. PCT/EP99/02066, filed on Mar. 26, 1999.

(30) Foreign Application Priority Data

Apr. 7, 1998 (DE) .......................................... 198 15 608

(51) Int. Cl.[7] .............................................. B01J 23/32
(52) U.S. Cl. ..................................................... 502/324
(58) Field of Search ................................ 502/319, 324, 502/343, 345, 350, 337, 338

(56) References Cited

U.S. PATENT DOCUMENTS

| | | | |
|---|---|---|---|
| 4,520,124 A | * | 5/1985 | Abe et al. .................... 502/159 |
| 4,891,348 A | * | 1/1990 | Imanari et al. ............. 502/309 |
| 5,106,802 A | * | 4/1992 | Horiuchi et al. ............... 502/65 |
| 5,234,882 A | | 8/1993 | Pfefferle |
| 5,380,692 A | * | 1/1995 | Nakatsuji et al. ........... 502/303 |
| 5,610,117 A | * | 3/1997 | Horiuchi et al. ............ 502/324 |

FOREIGN PATENT DOCUMENTS

| | | |
|---|---|---|
| DE | 44 16 469 C1 | 9/1995 |
| DE | 195 36 752 A1 | 4/1997 |
| JP | 93-247767 | 12/1991 |

OTHER PUBLICATIONS

International application No. 99/10081 (Bergmann et al.), dated Mar. 4, 1999.

Manfred Nonnenmann "Metal Substrate for Automotive Exhaust Gas Catalysts"; MTZ Motortechnische Zeitschrift, Dec. 1984, pp. 493–499.

* cited by examiner

*Primary Examiner*—Stanley S. Silverman
*Assistant Examiner*—Edward M. Johnson
(74) *Attorney, Agent, or Firm*—Laurence A. Greenberg; Werner H. Stemer; Gregory L. Mayback

(57) ABSTRACT

In order to reduce polluting components of an exhaust gas from a combustion engine, a structure with a metal sheet is proposed, which has a catalytically active surface. The surface of the metal sheet is at least partially provided with a catalytically active metal oxide layer, in particular titanium oxide.

21 Claims, 2 Drawing Sheets

CATALYTICALLY ACTIVE STRUCTURE

CROSS-REFERENCE TO RELATED APPLICATION

This is a continuation of copending International Application PCT/EP99/02066, filed Mar. 26, 1999, which designated the United States.

BACKGROUND OF THE INVENTION

Field of the Invention

The invention relates to a catalytically active structure, in particular a honeycomb structure, through which an exhaust gas from a combustion engine can flow and which is formed by at least one metal sheet which has a catalytically active surface.

In order to reduce polluting components, for example unburnt hydrocarbons, carbon monoxide and nitrogen oxides, structures, in particular honeycomb structures, are used which have a catalytically active surface. The structure may be formed by a monolithic ceramic honeycomb body. Structures are also known which are formed by rolled up and/or stacked metal sheets. The metallic structures are coated with a thin layer of aluminum oxide (wash coat). The aluminum oxide increases the surface area of the structure. A catalytically active material is distributed over the aluminum oxide layer. The material contains platinum, rhodium and palladium.

In order to optimize the way in which the exhaust-gas catalytic converter functions, the air-fuel mixture in the exhaust gas needs to be controlled accurately. To this end, a lambda probe is arranged in the exhaust pipe, upstream of the exhaust-gas catalytic converter relative to the flow direction of the exhaust gas. The lambda probe is connected to a control system of the combustion engine, through the use of which a formation of the mixture of the combustion engine can be controlled. Such systems for reducing the polluting components of an exhaust gas are also known as three-way catalysts for motor vehicles.

According to Nonnenmann in his article "Metallträger für Abgaskatalysatoren in Kraftfahrzeugen" [Metal supports for exhaust-gas catalytic converters in motor vehicles] MTZ Motortechnische Zeitschrift, volume 45 No. 12/1984, there have also existed metal catalysts made of catalytically active metal sheets, for example monel, but which were not successful.

Also in the field of small motors, for example motors for lawnmowers, chainsaws, motor cycles with small cylinder capacity and the like, it is desirable to reduce exhaust-gas components from such combustion engines using catalytically active structures. However, such combustion engines do not have a motor control system, and do not have lambda probes in the exhaust pipe, with the result that it is not possible to control the formation of the mixture in order to minimize pollution.

Small motors run on a rich mixture, that is to say with an excess of fuel. With such combustion engines, the problem arises that a large amount of unburnt hydrocarbons reach a catalytically active structure and are combusted there. Hence, the risk arises of so-called hot spot formation, which can destroy the catalytically active surface. In particular, there is a risk that, when a catalytically active structure which has a wash coat is used, the wash coat may become vitrified so that the catalytically active structure can achieve only a short working life.

SUMMARY OF THE INVENTION

It is accordingly an object of the present invention to provide a catalytically active structure that overcomes the above mentioned disadvantages of the prior art devices and methods of this general type and which is also suitable for a combustion engine that does not have a system for controlling the formation of the mixture.

With the foregoing and other objects in view there is provided, in accordance with the invention, a catalytically active honeycomb structure through which an exhaust gas from a combustion engine can flow, comprising at least one metal sheet having a catalytically active surface being at least partially provided with a catalytically active metal oxide layer, wherein the metal oxide is an oxide of a metal from the fourth period selected from the group consisting of Ti, V, Zn, Fe, Cr, Mn, Ni, Cu and Co.

The specific activity of the metal oxide layer is in this case lower than the specific activity of the catalytically active metals selected from the noble metal group, as are used in three-way catalysts. Such a catalytically active structure is, in particular, suitable for combustion engines which do not have a system for controlling the formation of the mixture since only a part of the surplus fuel is catalytically converted at the surface of the metal oxide layer and so-called hot spot formation can therefore be avoided.

The metal oxide layer is formed directly on the metal sheet, so that it is possible to do without application of a support layer in the form of a wash coat, which simplifies the production of such a structure.

According to an advantageous refinement of the structure according to the invention, the metal of the metal oxide layer can be a constituent of the material of the metal sheet. The advantage of this embodiment is that the metal of the metal oxide layer is integrated in the material of the metal sheet, which provides good bonding of the metal oxide layer to the metal sheet. The metal oxide layer can be formed by heat-treating the metal sheet in an oxidizing atmosphere.

According to a further advantageous development of the structure, the metal oxide layer can be formed by oxidation of a metal layer applied to the metal sheet. The metal layer can, for example, be applied by rolling onto the metal plate. The metal layer can also be applied to the metal sheet by dipping the base material in a liquid metal. As an alternative, the metal layer can be applied to the metal sheet by spraying. In this case, the metal forming the metal layer can be sprayed in liquid form or as dust. Depending on which metal forms the metal layer, the metal layer can also be formed by electrolytic deposition.

It is not absolutely necessary for the metal layer to be applied over the entire surface of the metal sheet. The metal layer can also be applied to certain parts of the metal sheet only. The metal oxide layer is formed by oxidation of the metal layer applied to the metal sheet.

The metal oxide layer can also be applied directly to the metal sheet, so that the metal sheet has catalytic activity as soon as the metal oxide layer has been applied to the metal sheet.

According to a further advantageous refinement of the structure, the metal of the metal oxide layer can have a higher oxidation potential than constituents of the metal sheet. The result achieved by this is that primarily a catalytically active metal oxide layer is formed. The metal preferably does not form a stable passivation layer at the temperatures prevailing during use of the catalytic structure.

According to another advantageous refinement of the structure, the metal of the metal oxide, or the metal oxide itself, have at most a slight capacity for diffusing into the metal sheet. This prevents the metal, before the metal oxide is formed, or the metal oxide from excessively diffusing into the metal sheet, so that a catalytically active metal oxide layer remains on the metal sheet. In particular, the at most slight diffusion must also be ensured at elevated temperatures.

In order to ensure that the activity of the catalytic metal oxide layer is also unaffected, or affected only slightly, by the diffusion of material components of the metal sheet into the metal oxide layer, the structure can be configured such that the diffusion of all material components of the metal sheet into the metal of the metal oxide layer, or into the metal oxide layer, is at most slight. This prevents the metal oxide layer from becoming enriched with constituents of the metal sheet.

According to a particularly advantageous refinement of the structure according to the invention, the metal oxide is a titanium oxide, which has particularly high catalytic activity even compared with the other fourth period oxides according to the invention. The metal sheet itself is preferably formed from a material which contains titanium as an alloy constituent. The material of the metal layer can also contain iron, chromium and nickel as alloy components.

The metal oxide is preferably formed by a zinc oxide which is formed on a corrosion-resistant base material. The catalytic activity of zinc oxide is comparatively high for oxidation reactions. It is higher than that of iron oxide or chromium oxide. The layer of zinc as the metal layer may be applied by dipping the metal sheet in liquid zinc, or by spraying zinc (in liquid form or as dust) or alternatively by electrolytic deposition from a zinc salt solution.

Other features which are considered as characteristic for the invention are set forth in the appended claims.

Although the invention is illustrated and described herein as embodied in a catalytically active structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
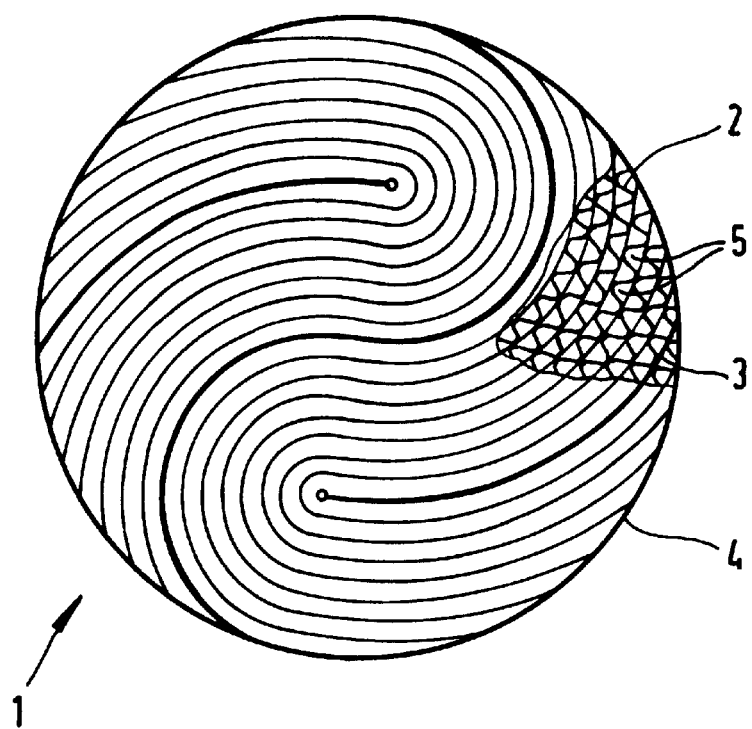
FIG. 1 schematically shows a honeycomb structure.

FIG. 1 represents a structure 1 schematically and by way of example. The structure 1 is essentially a honeycomb formed by corrugated metal sheets 2 and smooth metal sheets 3. The corrugated metal sheets 2 and the smooth metal sheets 3 are stacked and intertwisted in an "S" shape. The corrugated metal sheets 2 and the smooth metal sheets 3 delimit channels through which an exhaust gas from a combustion engine can flow. The corrugated metal sheets 2 and the smooth metal sheets 3 are accomodated in a containing tube 4.

The structure 1, as represented by way of example in FIG. 1, is configured in such a way that it is catalytically active. When an exhaust gas from a combustion engine passes through the structure 1, then reduction and/or oxidation of the components of the exhaust gas takes place.

Figure 2:
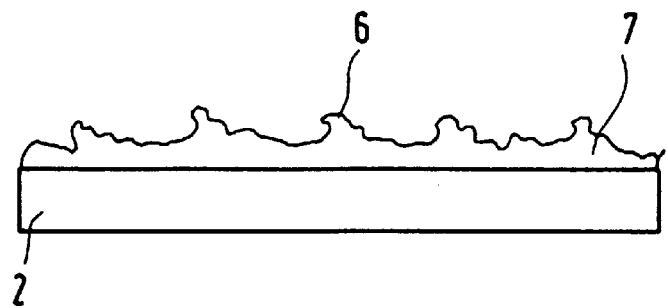
FIG. 2 schematically shows a metal sheet having a metal oxide layer.

FIG. 2 shows a schematic enlargement of a metal sheet 2 which is formed by a foil. The metal sheet 2 has a catalytically active surface 6. The catalytically active surface 6 of the metal sheet 2 is formed by a metal oxide layer 7. The entire surface of the metal sheet can be provided with a metal oxide layer 7. Both the corrugated metal sheets 2 and the smooth metal sheets 3 can be provided with a metal oxide layer. The metal oxide layer 7 is an oxide layer which is formed by oxidation of a non-noble metal.

Figure 3:
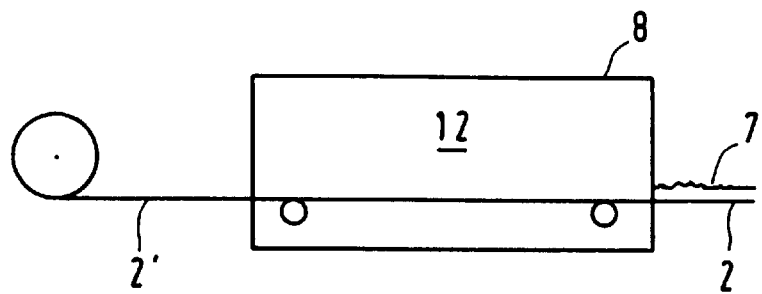
FIG. 3 shows a first illustrative embodiment of a device for forming a metal sheet having a metal oxide layer.

FIG. 3 illustrates a method to produce a metal sheet 2 having a metal oxide layer 7, by passing an oxide-free metal sheet 21 continuously through an oxidation device 8. The oxidation device 8 has a chamber 12 which contains an atmosphere suitable for the formation of a metal oxide layer. The oxidation device 8 also has heaters (not shown) with which a temperature suitable for the formation of the metal oxide layer 7 is set in the chamber 12. The metal sheet 2' is preferably heated in the oxidation device 8 to a temperature of at least 350° C. and kept for a predetermined time at the oxidation temperature. The oxidation temperature and the oxidation time essentially depend on the material of the metal sheet 2' and the oxidation atmosphere in the chamber 12. According to the desired formation of the metal oxide layer 7, individual parameters can be set in such a way that the desired metal oxide layer 7 is formed on the metal sheet 2.

On the metal sheet 2 according to FIG. 3, the metal oxide layer 7 was produced by the oxidation of a metal which is a component of the material of the metal sheet 2'. In this case, the metal of the metal oxide layer preferably has a higher oxidation potential than other constituents of the metal sheet 2. The oxidation of the metal sheet 2' preferably takes place in such a way that the metal sheet 2' is not completely depleted of the metal which forms the metal oxide layer.

The metal alloy of the metal sheet 2' should also be selected such that the metal of the metal oxide layer, or the metal oxide, exhibits at most moderate diffusion into the metal sheet. This ensures that a metal oxide layer 7 is actually formed. In order to achieve maximum activity of the metal oxide layer 7, it is also advantageous if the other material components of the metal sheet 2' have at most a moderate rate of diffusion into the metal oxide layer. The oxidation process therefore takes place more rapidly than the process of a material component diffusing into the metal oxide layer, so that mixed oxide formation is prevented. The metal oxide layer is preferably an oxide layer which is formed by metal oxides, in particular $TiO_2$, $V_2O_5$, ZnO, $Fe_2O_3$, $Cr_2O_3$, $MnO_2$, NiO, CuO and/or $Co_3O_4$. The formation of a metal oxide layer of titanium oxide is particularly preferred.

Instead of a continuous oxidation process for the metal sheet 2', discontinuous oxidation of at least one metal sheet 2' can also take place. For economic reasons, however, a continuous production process is expedient.

Figure 4:
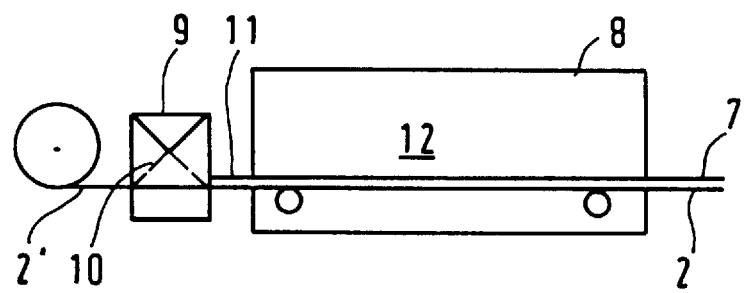
FIG. 4 shows a second illustrative embodiment of a device for forming a metal sheet having a metal oxide layer, and FIG. 5 schematically shows a third illustrative embodiment of a device for forming a metal sheet having a metal oxide layer.

FIG. 4 schematically shows a second illustrative embodiment of a device for forming a metal sheet 2 having a metal oxide layer 7. The device comprises a coating unit 9. Using the coating unit 9, a metal 10 is applied to the metal sheet 2, which can be foil. The metal 10 forms a metal layer 11 on the metal sheet 2'. The metal sheet 2' prepared in this way is fed to an oxidation device 8. In the oxidation device 8, which has a chamber 12, oxidation of the metal layer 11 takes place. The oxidized metal layer 11 forms a metal oxide layer 7 according to the invention. The chamber 12 contains an oxidizing atmosphere. The oxidation device 8 also has heating devices (not shown) with which the metal sheet having the metal layer 11 is-heated. Besides oxidation of the metal layer 11, bonding of the metal or metal oxide of the metal oxide layer 7 to the metal sheet 2 also takes place.

The metal 10 may be applied to the metal sheet 2' by a physical or chemical route. Depending on the procedure by which the metal sheet 2' is coated, it is possible to do without additional oxidation in a separate oxidation device 8 if the metal 10 is applied to the metal sheet 2' in an oxidizing atmosphere. The metal can, for example, be applied by spraying a liquid metal in an oxidizing atmosphere.

Using the coating unit 9, the metal sheet 2' can be provided with a metal in selected regions. It is also possible to form a metal sheet 2 having a metal oxide layer 7 with the metal oxide layer 7 comprising different metal oxides or possessing regions which contain different metal oxides.

Figure 5:
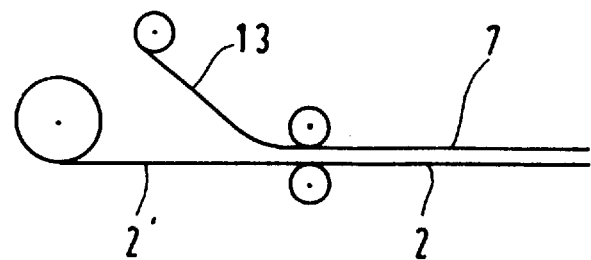

FIG. 5 schematically shows a further illustrative embodiment of a possible way of producing a metal sheet 2 having a metal oxide layer 7. The metal sheet 2 having a metal oxide layer 7 is formed by rolling a metal sheet 21 with a metal oxide film 13. If appropriate, the resultant metal sheet 2 having a metal oxide layer 7 can be subjected to further treatment steps, in particular a heat treatment, through which a permanent bond is made between the metal oxide layer 7 and the metal sheet 2.

The metal sheet 2 or 2' is preferably formed by an approximately 8 $\mu$m thick foil. The foil is, in particular, titanium foil with stabilizing additions of iron, chromium and vanadium. Such titanium film can be deformed very readily, so that it can be used in particular for the formation of structured metal sheets.

As an alternative, it is also possible to form a metal sheet having a metal oxide layer by galvanizing a corrosione resistant aluminum-free foil and oxidizing it in an oxidizing atmosphere.

I claim:

1. A catalytically active honeycomb structure through which an exhaust gas from a combustion engine can flow, comprising:
    at least one metal sheet having a catalytically active surface being at least partially provided with a catalytically active metal oxide layer,
    said metal oxide being an oxide of a metal from the fourth period selected from the group consisting of Ti, V, Zn, Fe, Cr, Mn, Ni, Cu and Co; and said metal oxide being formed directly on the metal sheet without application of a support layer in form of a wash coat, wherein the metal oxide layer is formed by oxidizing a constituent of the material of the metal sheet or by oxidizing a metal layer applied to the metal sheet.

2. The catalytically active structure according to claim 1, wherein said metal oxide layer is formed by oxidation of a metal layer applied to said at least one metal sheet.

3. The catalytically active structure according to claim 1, wherein:
    said metal sheet includes constituents; and
    said metal of said metal oxide layer has a higher oxidation potential than said constituents of said metal sheet.

4. The catalytically active structure according to claim 1, wherein said metal of said metal oxide exhibits at most a slight diffusion of said metal of said metal oxide into said metal sheet.

5. The catalytically active structure according to claim 1, wherein said metal of said metal oxide is titanium.

6. The catalytically active structure according to claim 1, wherein said metal oxide layer is formed on all of said metal sheet.

7. The catalytically active structure according to claim 1, wherein said metal oxide layer is formed on less than all of said metal sheet.

8. The catalytically active structure according to claim 1, wherein a metal of said metal sheet and a metal of said metal oxide layer are identical.

9. The catalytically active structure according to claim 1, wherein a metal of said metal sheet and a metal of said metal oxide layer are different.

10. The catalytically active structure according to claim 1, wherein a metal of said metal oxide layer is zinc.

11. The catalytically active structure according to claim 1, wherein said metal oxide layer comprises a plurality of metal oxides.

12. A method of producing a catalytically active structure the method which comprises:
    providing an oxide-free metal sheet;
    passing the oxide-free metal sheet continuously through an oxidation device including a chamber containing an atmosphere suitable for the formation of a metal oxide layer and at least one heater with which a temperature suitable for the formation of the metal oxide layer is established in the chamber;
    heating the metal sheet in the oxidation device to an oxidation temperature of at least 350° C. and keeping the metal sheet at the oxidation temperature for a predetermined time such that the metal oxide layer is formed from a constituent of the material of the metal sheet or from a metal layer applied to the metal sheet directly on at least a part of the surface of the metal sheet without application of a support layer in form of a wash coat.

13. The method according to claim 12, which comprises providing a metal of the metal oxide layer with a higher oxidation potential than other constituents of the metal sheet.

14. The method according to claim 12, which comprises oxidizing the metal sheet such that the metal sheet is not fully depleted of a metal which forms the metal oxide layer.

15. The method according to claim 12, which comprises initially applying a metal to at least part of a surface of the metal oxide-free metal sheet.

16. The method of claim 12, which comprises a metal sheet having a catalytically active surface.

17. The method of claim 16, which comprises a metal of a metal sheet being selected from the group consisting of Ti, V, Zn, Fe, Cr, Mn, Ni, Cu, and Co.

18. The method of claim 17, which comprises the metal titanium.

19. The method of claim 17, which comprises the metal zinc.

20. A catalytically active honeycomb structure through which an exhaust gas from a combustion engine can flow, comprising:
    at least one metal sheet having a catalytically active surface being at least partially provided with a catalytically active metal oxide layer including a metal oxide, said metal sheet being formed of metal in the elemental state, said metal oxide being an oxide of a metal from the fourth period selected from the group consisting of Ti, V, Zn, Fe, Cr, Mn, Ni, Cu and Co, and said metal oxide being formed directly on the metal sheet without application of a support layer in form of a wash coat.

21. A method of producing a catalytically active structure, the method which comprises:

providing an oxide-free metal sheet formed of metal in the elemental state;

passing the oxide-free metal sheet continuously through an oxidation device including a chamber containing an atmosphere suitable for the formation of a metal oxide layer and at least one heater with which a temperature suitable for the formation of the metal oxide layer being established in the chamber;

heating the metal sheet in the oxidation device to an oxidation temperature of at least 350° C. and keeping the metal sheet at the oxidation temperature for a predetermined time such that the metal oxide layer is formed directly on at least a part of the surface of the metal sheet without application of a support layer in form of a wash coat.

* * * * *